(12) United States Patent
Aksak et al.

(10) Patent No.: US 11,271,497 B2
(45) Date of Patent: Mar. 8, 2022

(54) VIBRATION ENERGY HARVESTING USING A BASE MOUNTED PIEZOELECTRIC TRANSDUCER

(71) Applicant: Texas Tech University System, Lubbock, TX (US)

(72) Inventors: Burak Aksak, Lubbock, TX (US); Robert Koven, Lubbock, TX (US); Serdar Gorumlu, Lubbock, TX (US)

(*) Notice: Subject to any disclaimer, the term of this patent is extended or adjusted under 35 U.S.C. 154(b) by 886 days.

(21) Appl. No.: 15/976,113

(22) Filed: May 10, 2018

(65) Prior Publication Data

US 2018/0367066 A1    Dec. 20, 2018

Related U.S. Application Data

(60) Provisional application No. 62/519,650, filed on Jun. 14, 2017.

(51) Int. Cl.
*H02N 2/18* (2006.01)
*H02N 2/00* (2006.01)

(52) U.S. Cl.
CPC ............... *H02N 2/188* (2013.01); *H02N 2/22* (2013.01)

(58) Field of Classification Search
CPC ........ H02N 2/18; H02N 2/188; H01L 41/113; H01L 41/1134; H01L 41/1136
See application file for complete search history.

(56) References Cited

U.S. PATENT DOCUMENTS

| | | | |
|---|---|---|---|
| 6,407,484 B1 | 6/2002 | Oliver et al. | |
| 6,858,970 B2 | 2/2005 | Malkin et al. | |
| 7,649,305 B2 | 1/2010 | Priya et al. | |
| 7,687,977 B2 | 3/2010 | Xu | |
| 7,928,634 B2 | 4/2011 | Fang | |
| 8,471,439 B2 | 6/2013 | Moon et al. | |
| 8,633,634 B2 | 1/2014 | Fuentes-Fernandez et al. | |
| 9,118,187 B1 | 8/2015 | Islam | |
| 9,362,480 B2 | 6/2016 | Andosca | |
| 9,388,041 B2 | 7/2016 | Fuentes-Fernandez et al. | |
| 9,548,860 B2 | 1/2017 | Eltamaly et al. | |
| 9,711,711 B2 | 7/2017 | Hall et al. | |
| 9,716,463 B2 | 7/2017 | Knowles et al. | |

(Continued)

OTHER PUBLICATIONS

Shengxi Zhou, et al., "Modeling and experimental verification of doubly nonlinear magnet-coupled piezoelectric energy harvesting from ambient vibration", Smart Mater. Struct. 24 (2015) 055008, pp. 1-13.

(Continued)

*Primary Examiner* — J. San Martin

(74) *Attorney, Agent, or Firm* — Loza & Loza LLP; Kevin L. Soules

(57) ABSTRACT

An energy harvester apparatus, system and method. A cantilevered beam resonator includes a cantilever beam and a base defined by the ends of the cantilever beam. The cantilevered beam resonator further includes a piezoelectric transducer composed of one or more piezoelectric components. The piezoelectric transducer is generally mounted beneath the base of the cantilevered beam resonator. In some example embodiments, the piezoelectric component can be configured in a split electrode configuration composed of a single split arrangement or more than one split (e.g., two splits, three splits, four splits, and so on).

20 Claims, 5 Drawing Sheets

(56) References Cited

U.S. PATENT DOCUMENTS

| | | | |
|---|---|---|---|
| 9,728,707 B2 | 8/2017 | Vaeth et al. | |
| 9,787,220 B2 | 10/2017 | Herder et al. | |
| 9,837,933 B2 | 12/2017 | Park et al. | |
| 9,876,445 B2 | 1/2018 | Jeong et al. | |
| 2005/0253486 A1* | 11/2005 | Schmidt | H01L 41/1136 310/329 |
| 2010/0170332 A1* | 7/2010 | Kammann | B60C 23/041 73/146.5 |
| 2011/0031846 A1* | 2/2011 | Syed | H01L 41/1136 310/319 |
| 2012/0204747 A1* | 8/2012 | Rastegar | F42C 9/16 102/210 |
| 2013/0049538 A1* | 2/2013 | Rastegar | H02N 2/186 310/329 |
| 2013/0207520 A1* | 8/2013 | Near | H02N 2/186 310/339 |
| 2015/0035409 A1 | 2/2015 | Procopio et al. | |

OTHER PUBLICATIONS

Geoffrey Werner Allen, et al., "Deploying a Wireless Sensor Network on an Active Volcano", IEEE Internet Computing, Mar.-Apr. 2006, p. 18-25.

Ziyang Wang, et al., "Shock Reliability of Vacuum-Packaged Piezoelectric Vibration Harvester for Automotive Application", Journal of Microelectromechanical Systems, vol. 23, No. 3, Jun. 2014, pp. 539-548.

Antonio Arnau Vives, "Piezoelectric Transducers and Applications", 2nd Edition, 2008 Springer-Verlag Berlin Heidelberg, pp. 1-30.

Shad Roundy, et al., "A study of low level vibrations as a power source for wireless sensor nodes", Computer Communications 26 (2003) 1131-1144.

M. Renaud, et al., "Fabrication, modelling and characterization of MEMS piezoelectric vibration harvesters", Sensors and Actuators A 145-146 (2008) 380-386.

Michael Renaud et al., "Optimization of a piezoelectric unimorph for shock and impact energy harvesting", Smart Mater. Struct. 16 (2007) 1125-1135.

Elizabeth K. Reilly et al., "A Study of Ambient Vibrations for Piezoelectric Energy Conversion", PowerMEMS 2009, Washington DC, USA, Dec. 1-4, 2009, pp. 312-315.

J. Dicken et al., "Power-Extraction Circuits for Piezoelectric Energy Harvesters in Miniature and Low-Power Applications", IEEE Transactions on Power Electronics and Industrial Electronics Special Issue 2012, pp. 1-16.

Piezoelectricity, Wikipedia, https://en.wikipedia.org/wiki/Piezoelectricity, dowloaded Jun. 7, 2017.

Joseph A. Paradiso et al., "Energy Scavenging for Mobile and Wireless Electronics", Pervasivecomputing, Jan.-Mar. 2005, pp. 1536-1268.

Daniel Motter et al., "Vibration Energy Harvesting Using Piezoelectric Transducer and Non-Controlled Rectifiers Circuits", J. of the Braz. Soc. of Mech. Sci. & Eng., Special Issue 2012, vol. XXXIV, pp. 378-385.

Marcin Marzencki et al., "Integrated power harvesting system including a MEMS generator and a power management circuit", Sensors and Actuators A 145-146 (2008) 363-370.

Huicong Liu et al., "Piezoelectric MEMS Energy Harvester for Low-Frequency Vibrations With Wideband Operation Range and Steadily Increased Output Power", Journal of Microelectromechanical Systems, vol. 20, No. 5, Oct. 2011, pp. 1131-1142.

Jing-Quan Liu et al., "A MEMS-based piezoelectric power generator array for vibration energy harvesting", Microelectronics Journal 39 (2008) 802-806.

S. Leadenham et al., "Nonlinear M-shaped broadband piezoelectric energy harvester for very low base accelerations: primary and secondary resonances", 2015 Smart Mater. Struct. 24 055021.

Dongwon Kon et al., "A Rectifier-Free Piezoelectric Energy Harvester Circuit", Georgia Tech Analog, Power, and Energy IC Research, pp. 1-4.

Ingo Kuehne et al., "A new approach for MEMS power generation based on a piezoelectric diaphragm", Sensors and Actuators A 142 (2008) 292-297.

Sang-Gook Kim et al., "Piezoelectric MEMS for energy harvesting", Materials Research Society Bulletin, vol. 37, Nov. 2012, p. 1039-1050.

Miso Kim et al., "Modeling and experimental verification of proof mass effects on vibration energy harvester performance". Smart Mater. Struct. 19 (2010) 045023 (21pp).

Hyun, Kim et al., "Laser-Machined Piezoelectric Cantilevers for Mechanical Energy Harvesting", IEEE Transactions on Ultrasonics, Ferroelectrics, and Frequency Control, vol. 55, No. 9, Sep. 2008, pp. 1900-1905.

Dongwon Kwon et al., "A Rectifier-Free Piezoelectric Energy Harvester Circuit", Georgia Tech Analog, Power, and Energy IC Research, pp. 1-4.

Arman Hajati et al., "Ultra-wide bandwidth piezoelectric energy harvesting", Applied Physics Letters 99, 083105 (2011).

T J Galchev et al., "Harvesting traffic-induced vibrations for structural health monitoring of bridges", J. Micromech. Microeng. 21 (2011) 104005 (13pp).

Michael Friswell et al., "Non-linear piezoelectric vibration energy harvesting from a vertical cantilever beam with tip mass", Journal of Intelligent Material Systems and Structures, 23(13) 1505-1521.

M. Ferrari et al., "Improved energy harvesting from wideband vibrations by nonlinear piezoelectric converters", Sensors and Actuators A 162 (2010) 425-431.

Alper Erturk et al., "Piezoelectric Energy Harvesting", A. John Wiley & Sons, 2011, pp. 1-402.

A. Erturk et al., "An experimentally validated bimorph cantilever model for piezoelectric energy harvesting from base excitations", Smart Mater. Struct. 18 (2009) 025009 (18pp).

A. Erturk et al., "A Distributed Parameter Electromechanical Model for Cantilevered Piezoelectric Energy Harvesters", Journal of Vibration and Acoustics, Aug. 2008, vol. 130, pp. 1-15.

A. Erturk et al., "On Mechanical Modeling of Cantilevered Piezoelectric Vibration Energy Harvesters", Journal of Intelligent Material Systems and Structures, vol. 19—Nov. 2008, pp. 1311-1325.

R. Elfrink et al., "Vibration energy harvesting with aluminum nitride-based piezoelectric devices", J. Micromech. Microeng. 19 (2009) 094005 (8pp).

Lokesh Dhakar et al., "A new energy harvester design for high power output at low frequencies", Sensors and Actuators A 199 (2013) 344-352.

A.F Arrieta et al., "A piezoelectric bistable plate for nonlinear broadband energy harvesting", Applied Physics Letters 97, 104102, 2010, pp. 1-3.

\* cited by examiner

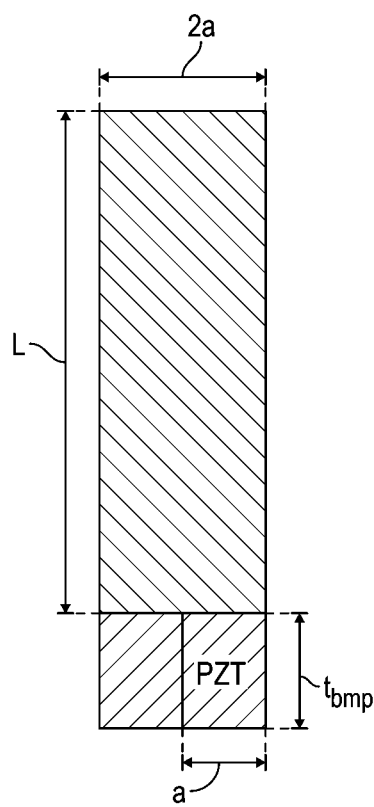
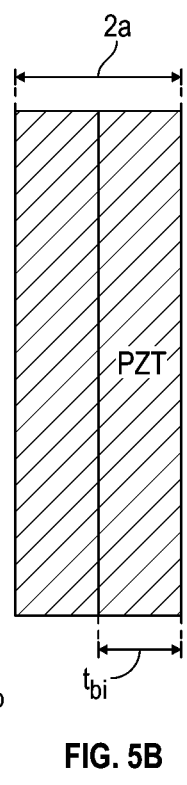
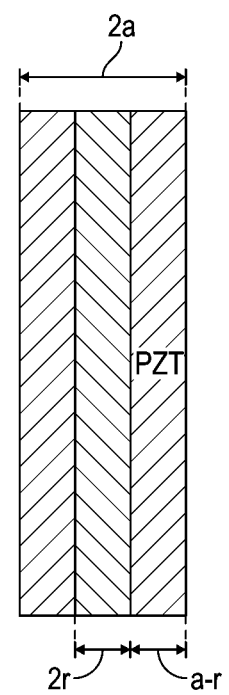
FIG. 5A
FIG. 5B
FIG. 5C

VIBRATION ENERGY HARVESTING USING A BASE MOUNTED PIEZOELECTRIC TRANSDUCER

CROSS-REFERENCE TO PROVISIONAL APPLICATION

This nonprovisional patent application claims the benefit under 35 U.S.C. § 119(e) of U.S. Provisional Patent Application Ser. No. 62/519,650 filed on Jun. 14, 2017, entitled "Vibration Energy Harvesting Using a Base Mounted Piezoelectric Transducer". U.S. Provisional Patent Application Ser. No. 62/519,650 is incorporated herein by reference in its entirety.

TECHNICAL FIELD

Embodiments are related to piezoelectric energy harvester systems, devices and systems. Embodiments further relate to cantilevered beams and piezoelectric transducers. Embodiments also relate to a vibration energy harvester apparatus.

BACKGROUND

Thanks to the miniaturization of sensors and continued reductions in the power consumed by microcontrollers and wireless transmitters, it has become increasingly popular to place sensors in locations that are remote, difficult to access, or both. Since it is often not possible to run wires to sensors in these locations, and access can even be so restricted that changing batteries is not feasible, researchers have been exploring ways to scavenge the energy required to power sensor systems from the sensors' environment. Light, heat, and RF radiation are all common sources of energy from which a system can scavenge energy. In some cases, however, such as, for example, monitoring the structural integrity of buildings and bridges or the air pressure in a tire, the most abundant source of accessible energy is vibrations.

Because of their ease of fabrication and high power density at small scale, one of the most effective means of scavenging vibrational energy is through the use of piezoelectric materials. Transducers made from piezoelectric materials use the direct piezoelectric effect, electric polarization as a result of external applied load, to convert mechanical energy to electrical energy. The most common piezoelectric energy harvesters are based on cantilevered piezoelectric unimorphs and bimorphs, hereafter to be referred to as a PBG (Piezoelectric Bender generator). A PBG is composed of a support layer with one (e.g., unimorph) or two (e.g., bimorph) piezoelectric layers and a proof mass attached to the free end of the beam to tune the resonant frequency and increase the output power. In a PBG, vibrations cause the tip mass to deflect the cantilever beam, which generates normal stress along the axial direction (e.g., direction-1) of the piezoelectric component. This stress creates a net electric polarization in the thickness direction (e.g., direction-3), which can then be harvested and stored. This type of piezoelectric energy harvesting is often referred to as mode-31 harvesting. The behavior of a PBG is best described using beam mechanics; however, a SDOF (Single Degree of Freedom) lumped parameter model, ideally with a correction factor, is often used because of its simplicity. The resonance characteristics of a PBG are usually determined by the dimensions, tip mass, and the material properties, such as elastic modulus, of the piezoelectric transducer that makes up a portion of the resonating beam.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is therefore one aspect of the disclosed embodiments to provide for a piezoelectric energy harvester system, apparatus and method that includes a cantilevered beam with a tip mass mounted perpendicular to a piezoelectric transducer.

It is another aspect of the disclosed embodiments to provide for a piezoelectric energy harvester system, apparatus and method that can be used to harvest energy from ambient vibrations, and which can also be used as an actuator or sensor.

It is also an aspect of the disclosed embodiments to provide for a piezoelectric energy harvester system, apparatus and method capable of extending the battery life of low power electronics, particularly wireless sensor nodes located in difficult to reach locations.

It is a further aspect of the disclosed embodiments to provide for a piezoelectric energy harvester system, apparatus and method including a base-mounted piezoelectric transducer and a transducer split configuration composed of one split or a group of splits, which allows for low frequency harvesting in applications where space is limited.

It is yet another aspect of the disclosed embodiments to provide for a piezoelectric energy harvester system, apparatus and method that provides for ease of manufacture and conversion of to a broadband harvester.

The aforementioned aspects and other objectives and advantages can now be achieved as described herein. An energy harvester apparatus, system and method are disclosed herein. In an example embodiment, a cantilevered beam resonator can be configured to include a cantilever beam and a base defined by the ends of the cantilever beam. The cantilever beam resonator is further configured to include a piezoelectric transducer composed of one or more piezoelectric components. The piezoelectric transducer is generally mounted beneath the base of the cantilevered beam resonator. The mechanical properties and resonant frequency of the cantilevered beam resonator are independent of the piezoelectric component(s). In some example embodiments, the piezoelectric component can be configured in a split electrode configuration composed of a single split arrangement or more than one split (e.g., two splits, three splits, four splits, and so on).

Piezoelectric vibration energy harvesters often include a cantilevered beam composed of a support layer and one or two piezoelectric layers with a tip mass. While this configuration is advantageous for maximizing electromechanical coupling, the piezoelectric material's properties can place limitations on harvester size and resonant frequency. The disclosed solutions address such issues.

This disclosure presents numerical and experimental results from a new type of piezoelectric energy harvester in which the mechanical properties and the resonant frequency of the cantilever beam resonator are independent of the piezoelectric component. Referred to as a BMP (Base Mounted Piezoelectric) harvester herein, this new design features a piezoelectric transducer mounted beneath the base of the cantilevered beam resonator. The flexibility in the material choice for the cantilever beam resonator results in a low degree of dependency of the resonant frequency on the beam dimensions.

A prototype configured with, for example, a 1.6 mm×4.9 mm×20.0 mm polyurethane beam, a PZT-5H piezoelectric transducer, and an 8.36 g tip mass is shown to produce an average power of 8.75 µW and 113 µW across a 13.0 MΩ load under harmonic base excitations of constant acceleration at, for example, 0.25 g and 1.0 g, respectively. Finite elements based numerical simulations are shown to be in reasonable agreement with experimental results, indicating that the harvester behaves like a linear resonator as proposed in the paper. Fabricated using casting and laser machining techniques, the disclosed harvester shows potential as a low cost option for powering small, low power wireless sensor nodes and other low power devices.

BRIEF DESCRIPTION OF THE DRAWINGS

The accompanying figures, in which like reference numerals refer to identical or functionally-similar elements throughout the separate views and which are incorporated in and form a part of the specification, further illustrate the disclosed embodiments and, together with the detailed description of the disclosed embodiments, serve to explain the principles of the present invention.

FIGS. 5(a) to 5(c) illustrate a BMP harvester and PBG bimorph diagrams, in accordance with an example embodiment.

DETAILED DESCRIPTION

Figures 1A, 1B:
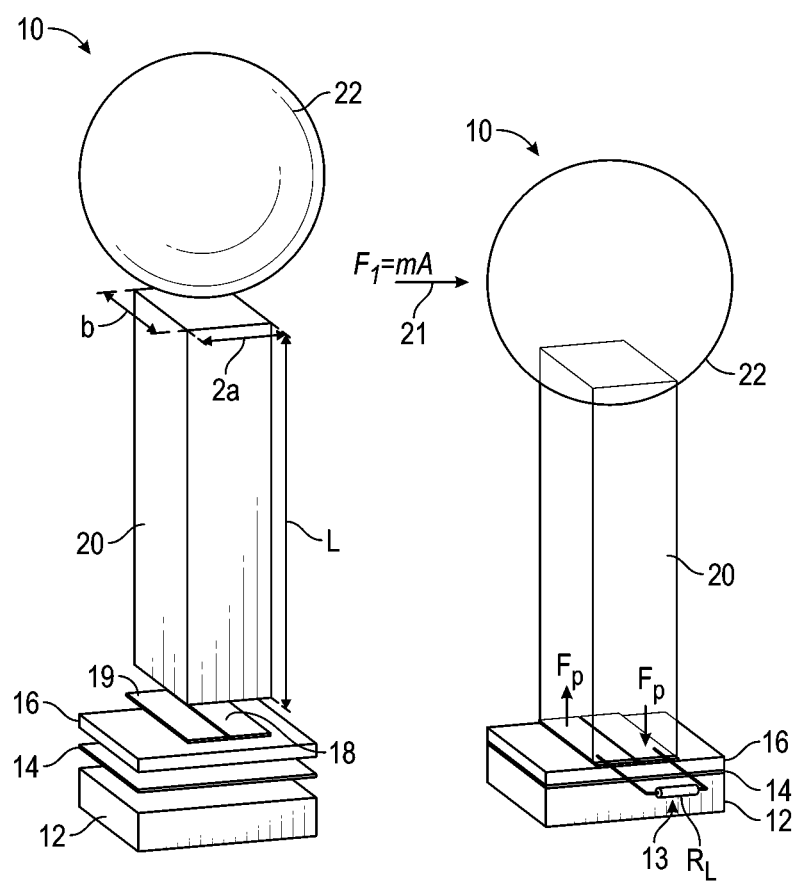
FIGS. 1(a) and 1(b) illustrate schematic diagrams depicting the basic design of a BMP harvester, in accordance with an example embodiment.

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to identical, like or similar elements throughout, although such numbers may be referenced in the context of different embodiments. As used herein, the term "and/or" includes any and all combinations of one or more of the associated listed items.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The disclosed embodiments describe a new type of piezoelectric energy harvester referred to as a BMP (Base Mounted Piezoelectric) harvester. A BMP harvester features a cantilevered beam with a tip mass on its free end and a transducer mounted beneath its base. The bending of the beam creates a normal stress on the piezoelectric material in the thickness direction, which then creates an electric polarization in the same direction. Thus, the energy harvesting is mode-33. The response of the beam, unlike in PBG type designs, is highly decoupled from the transducer. Specifically, the piezoelectric transducer makes practically no contribution to the stiffness or the durability of the beam. This type of construction, and the ability to decouple the deflection of the resonator from the piezoelectric material, facilitates the use of wide-variety of materials.

Note that the term "piezoelectric" as utilized herein refers generally to piezoelectricity and/or the piezoelectric effect. Piezoelectricity is the electric charge that accumulates in certain solid materials (e.g., such as crystals, certain ceramics, and biological matter such as bone, DNA and various proteins) in response to applied mechanical stress. The word piezoelectricity means electricity resulting from pressure. The piezoelectric effect is understood as the linear electromechanical interaction between the mechanical and the electrical state in crystalline materials with no inversion symmetry. The piezoelectric effect is a reversible process in that materials exhibiting the direct piezoelectric effect (the internal generation of electrical charge resulting from an applied mechanical force) also exhibit the reverse piezoelectric effect (the internal generation of a mechanical strain resulting from an applied electrical field).

Everything from metals to polymers can be used to construct a cantilevered beam in the context of a BMP harvester. The flexibility in the choice of the beam material creates a new tool for harvester customization, wherein beam materials are capable of being selected to optimize desired qualities such as resonant frequency, bandwidth, cost, durability, ease of fabrication, and space utilization. The use of polymers, for example, allows for the easy manufacturing of mesoscale vibration energy harvesters with low resonant frequencies. While polymers can and have been used to fabricate PBGs, the inherent stiffness and brittleness of most piezoelectric transducers continue to introduce unavoidable design constraints.

At specific size scales, BMP harvesters are capable of producing as much or more power than PBG harvesters. Also, as we will show, BMP harvesters always produce more power per area of transducer than equivalent PBGs. Additionally, BMP harvesters can be manufactured on a size scale similar to energy harvesters fabricated using silicon MEMS manufacturing techniques, while remaining inexpensive to customize and produce in small batches.

The disclosed embodiments generally describe the design, theory, fabrication, and experimental implementation of a BMP harvester employing a polyurethane beam and a Lead Zirconate Titanate (PZT-5H) piezoelectric transducer is detailed. The design of a BMP harvester is described herein including the description of its working principle and a calculation of its electromechanical coupling. The fabrication of a BMP harvester, description of a numerical model for the harvester, and experimental procedures are also described herein. Experimental results from experiments and simulations, and a theoretical comparison to a PBG bimorph are further discussed herein.

FIGS. 1(a) and 1(b) illustrate schematic diagrams depicting the basic design of a BMP (Base Mounted Piezoelectric) harvester apparatus 10, in accordance with an example embodiment. The BMP harvester apparatus 10 generally includes a cantilever beam 20 that is mounted perpendicular to a piezoelectric substrate 16. In some example embodiments, the cantilever beam 20 may be implemented as a polyurethane beam or a beam configured from another type of material. In general a split top electrode composed of electrodes 18 and 19 is disposed above the piezoelectric substrate 16. A bottom electrode 16 is located below the piezoelectric substrate 16. An acrylic substrate 12 in turn is located below the bottom electrode 14. A piezoelectric transducer can generally include the piezoelectric substrate 16, the bottom electrode 14 and the split top electrode that includes electrodes 18 and 19. Note that in FIGS. 1(a) and 1(b) similar or identical parts or components are generally indicated by identical reference numerals.

FIG. 1(a) depicts an exploded view of components of the BMP harvester apparatus 10. FIG. 1(b) illustrates a diagram indicating the inertial tip force (see arrow 21) and the resulting compressive/tensile forces on the piezoelectric transducer (which includes the piezoelectric substrate 16, the bottom electrode 14 and the aforementioned split top electrode). The inertial tip force indicated by arrow 21 in FIG. 1(b) results from base displacement that causes a pair of forces $F_p$ acting on the opposite sides of a neutral (i.e., centroidal) axis that are equal in magnitude and opposite in direction. A load resistance 13 is depicted in FIG. 1(b) with respect to the beam 20. The load resistance is also indicated by $R_L$.

The configuration shown in FIGS. 1(a) and 1(b) includes the cantilever beam 20 mounted perpendicular to the piezoelectric substrate 16. The piezoelectric layer thus features the split electrode on top and a single electrode 14 on the bottom as shown in FIG. 1(a). The inertial force at the tip of the beam 20 due to the lateral movement of the base (in direction-1) as shown in FIG. 1(b) results in a bending moment about the neutral axis at the base of the beam 20. The resulting stress on the piezoelectric layers linearly increases from zero at the neutral axis to its maximum.

The mechanical vibrations targeted by energy harvesters often occur at frequencies around or below 100 Hz. Since the BMP harvester 10 is essentially a damped mass-spring system, the resonant frequencies of the system are primarily dependent on the stiffness of the beam 20 and the magnitude of the tip mass 22. In a BMP harvester, the cantilever beam is mechanically in series with the piezoelectric transducer and the deflection of the beam is much larger compared to the deformation of the piezoelectric transducer. Thus, the piezoelectric transducer does not impose any mechanical limitation on the cantilever beam, which can then be significantly less stiff than the transducer. This allows small BMP harvesters to resonate at low frequencies.

Initially a static analysis is presented in order to describe the principle of operation of a BMP. This type of harvester is a means of converting mechanical vibrations into electrical energy and its dynamics are, in principle, very similar to the widely studied PBG harvester and involves basic principles of piezoelectricity. Stress, generated as a result of the inertial force applied at the tip of the beam, is in the thickness direction of the piezoelectric layer. For a long beam, the normal stress at the base is much larger than the shear stress and normal stress in the lateral direction. Therefore, the polarization of the piezoelectric material can simply be calculated using the following:

$$P_3 = d_{33} \sigma_3, \tag{1}$$

where P is the piezoelectric polarization, σ is the stress in the material, d is the piezoelectric coefficient, the subscript 3 references the thickness direction in the material, and the subscript 33 indicates that the piezoelectric coefficient is relating polarization density in the 3-direction to stress in the 3-direction.

The piezoelectric transducer is essentially a parallel plate capacitor with the piezoelectric material as the dielectric between the plates. Therefore, we can model the charge separation in its plates as $$Q = D_3 S = \varepsilon_3 E S + d_{33} \int \sigma_3 dS, \quad (2)$$

where $D_3$ is the electric displacement field between the plates of the capacitor, $\varepsilon_3$ is the permittivity of the piezoelectric material in the 3-direction, and S is the area of the capacitor electrodes. For simplicity we assume that the electrode area is equal to one half of the cross-sectional area of the beam. Rewriting eq. (2) in terms of the net force $F_p$ on an individual electrode, one obtains charge Q as:

$$Q = \varepsilon_3 E S + d_{33} F_p. \quad (3)$$

Using classical mechanics, the net force on an individual electrode can be found using $$F_p = \frac{M \alpha S}{2I} = \frac{2F_3 L}{4s}. \quad (4)$$

Here, $M = F_1 L$ is the internal bending moment at the base of the beam, $F_1 = mA$ is the equivalent force at the tip of the beam due to harmonic base excitation of acceleration amplitude A and tip mass m, $S = ab$ is half the cross-sectional area of the beam, and $I = 2ba^3/3$ is the area moment of inertia of the beam's cross-section. Substituting for S and $F_p$ in eq. (3), one obtains the static loading charge $Q_s$ as $$Q_s = \varepsilon_2 E a b + d_{33} \frac{3F_3 L}{4s} \cong d_{22} \frac{3F_3 L}{4s}, \quad (5)$$

This approximation holds true as long as E, which represents additional electric fields from sources such as applied voltages and electromechanical coupling, is very small. Dynamically, a BMP harvester is expected to behave very much like a damped mass-spring system. Thus, the magnitude of charge can be found, approximately, by using a lumped parameter model under sinusoidal base excitation of constant acceleration A. Assuming the frame of reference is fixed at the base of the cantilever, $$|Q| = \frac{Q_s}{\left[\left(1-\frac{\omega}{\omega_n}\right)^2 + \left(2\xi\frac{\omega}{\omega_n}\right)^2\right]^{\frac{1}{2}}} \quad (6)$$

$$= \frac{3 d_{33} m A L}{4a\left[\left(1-\frac{\omega}{\omega_n}\right)^2 + \left(2\xi\frac{\omega}{\omega_n}\right)^2\right]^{1/2}},$$

where $\omega$ is the excitation frequency, $\omega_n$ is the natural frequency of the beam, and $\xi$ is the damping ratio.

The above expression is for charge under one half of the base of the beam stretching from the neutral axis to an outer edge and under open circuit conditions. As can be seen in FIGS. 1(a) and 1(b), there are actually two electrodes under the base of the beam 20, one on either side of the neutral axis. These electrodes share a common base electrode on the opposite side of the piezoelectric layer creating the approximate equivalent of two parallel plate capacitors in series. Under ideal conditions, this does not affect the charge stored on the plates, it simply reduces the net capacitance of the system by half, thus doubling the energy stored in the system. Similarly, under time varying forces, this doubles the power output.

The equivalent electromechanical coupling $k_{33,eff}^2$ and general electromechanical coupling (GEMC) $K_g^2$ are two critical values that determine the effectiveness of a harvester in energy conversion and will be considered for a BMP harvester in this section. The GEMC represents the ratio of electrical energy stored in the piezoelectric transducer to the mechanical energy stored in the device for a given deflection and is related to $k_{33,eff}^2$ by $$K_g^2 = \frac{k_{33,eff}^2}{1 - k_{33,eff}^2}, \quad (7)$$

where $k_{33,eff}^2$ is the device equivalent of the electromechanical coupling $k_{33}^2$, which represents the ratio of electrical energy stored in the piezoelectric transducer to that of total energy stored under external load. Expressed in terms of material properties and component parameters, the device equivalent electromechanical coupling coefficient is (see Appendix A in U.S. Provisional Patent Application Ser. No. 62/519,650 for derivation details) as follows:

$$k_{33,eff}^2 = \frac{9 d_{33}^2 t_p Y_p Y_b}{\varepsilon_3 (4 L Y_p + 9 t_p Y_b)}. \quad (8)$$

where $t_p$ and $Y_p$ are the thickness and elastic modulus, respectively, of the piezoelectric transducer and $Y_b$ is the elastic modulus of the beam. Equations (7) and (8) can be used to find the GEMC as $$K_g^2 = \frac{9 d_{33}^2 t_p Y_p Y_b}{\varepsilon_3 (4 L Y_p + 9 t_p Y_b) - 9 d_{33}^2 t_p Y_p Y_b}, \quad (9)$$

A few relationships become apparent from $k_{33,eff}^2$ and $K_g^2$. Because the piezo ceramic is usually much stiffer than the beam material and the length of the beam is much larger than the thickness of the piezo ceramic, it is safe to assume $4LY_p \gg 9t_p Y_b$, in which case equation (8) can be simplified to $$k_{33,eff}^2 \approx \frac{9 d_{33}^2 t_p Y_b}{4 \varepsilon_3 L}. \quad (10)$$

This simplification applies to a harvester comprised of a polymer beam and PZT, as in the BMP harvester studied in this paper. Additionally, because increasing $k_{33,eff}^2$ will also increase the GEMC, increasing the elastic modulus of the beam $Y_b$ and the ratio $t_p/L$ will result in higher coupling coefficients for the BMP. Increasing the actual electromechanical coupling coefficient $k_{33}^2$ of the piezoelectric transducer (i.e. larger $d_{33}$ or smaller $\varepsilon_3$) will, as expected, also increase the effective coupling of the system.

Note that the base discussed herein is generally defined as the ends of the beam 20. This is because there is merit to the concept of placing a transducer beneath the tip mass 22 to recover some of the energy lost to tip mass inertia. This is particularly valid in some array arrangements involving a very large tip mass affixed to multiple beams. Thus, in some configurations, the disclosed base mounted transducers can be on either end of the beam.

FIGS. 2(a) to 2(f) illustrates a method of fabrication of a BMP harvester (e.g., the BMP harvester apparatus 10 shown in FIGS. 1(a) and 1(b)), in accordance with an example embodiment. Note that in FIGS. 1(a) to 1(b) and FIGS. 2(a) to 2(f), similar or identical parts or elements are generally indicated by identical reference numerals.

In the example embodiment shown in FIGS. 2(a) to 2(f), a BMP harvester can be configured from, for example, a 0.267 mm thick layer of PZT-5H (e.g., PSI-5H4E PZT, Piezo Systems Inc.), a polymer beam (e.g., 1.6 mm×4.9 mm×20.0 mm), and a steel tip mass 22. That is, the piezoelectric substrate 16 can be formed from a material such as the aforementioned PZT-5H layer.

The piezoelectric material (PZT) from Piezo Systems Inc. is an example of a sheet pre-coated with nickel electrodes on both sides, which can be adapted for use in accordance with an example embodiment. It should be appreciated that the disclosed embodiments are not limited to the use of the aforementioned specific piezoelectric material (PZT) from Piezo Systems Inc. This material is discussed herein, however, only for exemplary purposes and is not a limiting feature of the disclosed embodiments. Other types of piezoelectric material can be implemented in accordance with various alternative embodiments.

Figure 2C:
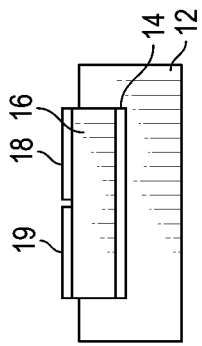
FIGS. 2(a) to 2(f) illustrates a method of fabrication of a BMP harvester (e.g., a BMP harvester apparatus or system), in accordance with an example embodiment.
Figure 2F:
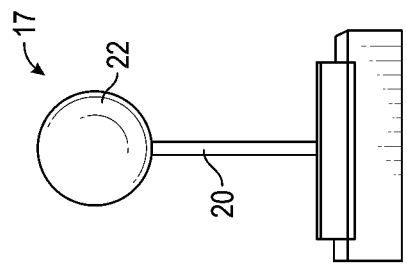
Figure 2B:
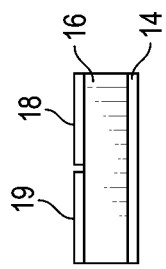
Figure 2E:
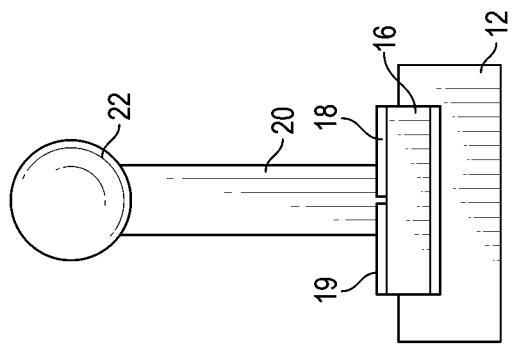
Figure 2A:
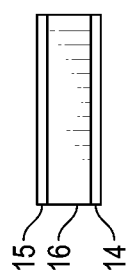

To shape the electrodes of the transducer, some of the nickel on one side of the PZT sheet can be etched away using, for example, a laser engraver (e.g., Laser Mini 30 W, Epilog) to create, for example, two 0.9 mm×5.5 mm electrodes as shown in FIG. 2(a). That is, FIG. 2(a) shows a bottom electrode 14 and a top electrode 15. The top electrode is shown in FIG. 2(a) as a solid layer, not yet split into the previously discussed two electrodes 18 and 19. Such a laser can be then used to cut the newly patterned transducer from the PZT sheet as shown in FIG. 2(b). The split electrodes 18 and 19 and are shown in FIG. 2(b). In other words, the split electrodes 18 and 19 are formed from the electrode or electrode layer 15 (i.e., the top electrode) shown in FIG. 2(a). The resulting transducer can be then mounted on a rigid backing substrate 12 using, for example, super glue (e.g., Loctite 404) as shown in FIG. 2(c).

It can be appreciated that the while split electrodes such as the split electrode configuration of the split electrodes 18 and 19 on the base mounted transducer are generally split down the neutral axis to be useful, there can be more than one (i.e., at least one) split depending on the shape of the beam. For example, a rectangular beam is best with just a single split. However, a square beam can be divided into four equal transducers with two splits (e.g., like a +). A circular beam might be divided into any number of wedge shaped transducers using any number of lines. Creating such extra transducers is worthwhile in cases where it is desired to harvest energy from vibrations in more than one direction. In other words, the disclosed embodiments are not limited to a single split but can be configured with a split arrangement of more than split (i.e., two, three, four, and so on).

Figure 2D:
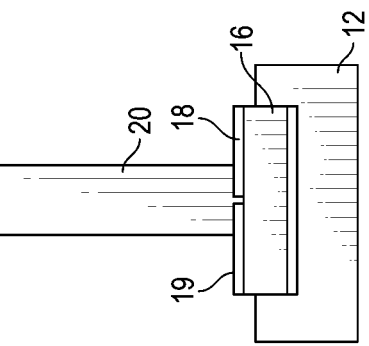

In the next step, the laser engraver can be used to cut out a sheet of acrylic of the desired dimensions of the beam to make a complimentary mold. The beam can be then fabricated by casting a polymer using this complementary mold as shown in FIG. 2(d). The BMP harvester fabricated for this particular example embodiment can utilize a clear polyurethane (e.g., Crystal Clear 200, Smooth-On) beam fabricated by cast forming in the complementary mold. In an experimental embodiment, a release agent (e.g., Ease Release 200, Mann Release Technologies) was used to cover the mold surface to prevent bonding between acrylic and the caste polyurethane. Once the new beam has cured, it can be removed from the mold and glued to the PZT using super glue (e.g., Loctite 404). The beam is positioned such that the neutral axis of the narrowest side is aligned with the division between the top electrodes of the transducer as shown in FIG. 2(e). Wires can be then soldered to the transducer's electrodes.

Note that the shape of the tip mass on a PBG may affect its power output. Therefore, for consistency among devices, we have used 12.7 mm diameter, 8.36 g chrome steel ball bearings as tip masses. The ball bearing can be mounted on the harvester beam using super glue (e.g., Loctite 404) as shown FIG. 2(e). The complete, fabricated BMP harvester is shown in the image 17 in FIG. 2(f). It should be appreciated that parameters and dimensions discussed above and elsewhere herein are provided for illustrative and exemplary purposes only and are not considered limiting features of the disclosed embodiment.

A model of the BMP harvester was created using an FEM program (COMSOL Multiphysics 5.2) for simulations. The numerical model employs the exact dimensions of the BMP harvester used for experiments, with the exception of the spherical tip mass, which was approximated as a cube in the numerical model. Modules of Solid Mechanics, Electrostatics, and Electrical Circuits in COMSOL were used in the Multiphysics domain to simulate the voltage and power harvested over a load resistance (e.g., such as the load resistance 13 illustrated in FIG. 1(b)) for a given base acceleration and tip mass.

The results were then compared with the experimentally obtained data. Reasonable agreement between the simulations and the experimental data were obtained for beam elastic modulus, $Y_b$=2.39 GPa, Poisson's ratio of the beam material, $v_b$=0.3, and piezoelectric coefficient $d_{33}$=750 pC/N, and a voltage correction factor of 1.18 to account for potential discrepancies between the fabricated and the simulated harvester. The rest of the properties of the piezoelectric material were directly implemented from the built-in material properties of PZT-5H in the COMSOL software. The viscous damping was measured and implemented as an isotropic structural loss factor, $\eta_s$=0.028.

The responses of a BMP harvester to different accelerations and frequencies were measured experimentally. Frequency sweeps, taken in 0.5 Hz increments, were performed using a closed loop system controlled by LabVIEW software (i.e., from National Instruments). The program controls the amplitude and frequency of a sinewave from a waveform generator (e.g., SDG 805 Function/Arbitrary Waveform Generator, Siglent Technologies) to a shaker (e.g., Type 4810 Mini-shaker, Brüel & Kjær) through a power amplifier (e.g., Type 2718, Brüel & Kjær). The program utilizes the feedback from an accelerometer (e.g., Type 4507 Piezoelectric CCLD accelerometer, Brüel & Kjær) mounted on the shaker to maintain constant peak acceleration. The accelerometer is connected to an oscilloscope (e.g., InfiniiVision DSO-X 2014A, Agilent Technologies) through a signal conditioner (e.g., Type 1704 2-channel Battery-powered CCLD Signal Conditioner, Brüel & Kjær).

The amplitude of the voltage output of the harvester, measured across a portion of a load resistance $R_L$ and scaled accordingly, is then recorded for post analysis. The voltage across the resistance is measured by the oscilloscope through a unity gain buffer made from an operational amplifier JFET inputs (e.g., OPA2132P, TI) powered by a BK Precision 1672 Triple Output DC Power Supply. The optimal value of $R_L$, determined experimentally and used for all measurements, was found to be 13.0 MΩ. The effect of acceleration on the power output of the device was observed by running frequency sweeps, which included the first resonant frequency of the harvester at 0.10 g, 0.25 g, 0.50 g, and 1.0 g peak accelerations.

As described in the discussion of its working principle, the BMP harvester is expected to behave like a damped mass-spring system whose impulse response is an exponentially decaying sinewave at the harvester's resonant frequency. As such, one can estimate the damping coefficient experimentally from impulse response using $$\xi = \frac{1}{2\pi n} \ln\left[\frac{V(t)}{V(t+n\tau_d)}\right]. \quad (11)$$

where n is the number of voltage peaks starting from zero at V(t), and $T_d$ is the period. Using equation (11) above, the damping coefficient of the harvester is calculated to be 0.014. This value was implemented as an isotropic structural loss factor such that $\eta_s = 2\xi \approx 0.028$ in the simulations.

Figure 3:
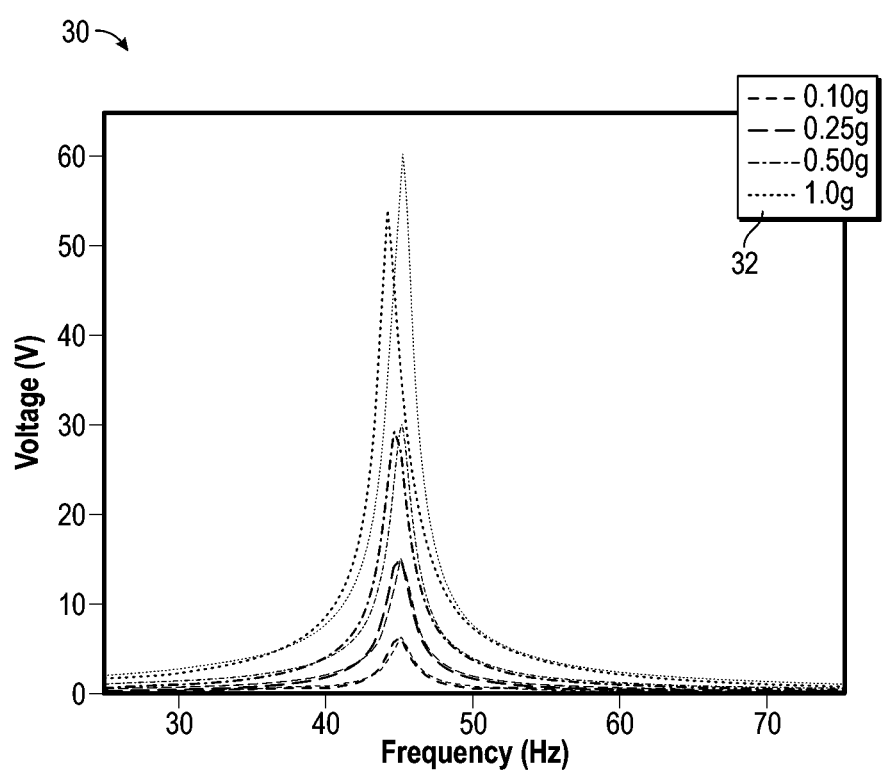
FIG. 3 illustrates a graph depicting experimental and simulated BMP harvester output data, in accordance with an example experimental embodiment.

FIG. 3 illustrates a graph 30 depicting experimental and simulated BMP harvester output data, in accordance with an example experimental embodiment. The graph 30 shown in FIG. 3 thus depicts experimental (e.g., solid lines) and simulated (e.g., dashed lines) BMP harvester voltage output at 0.1 g, 0.25 g, 0.50 g, and 1.0 g accelerations. These values are shown in the legend 32 associated with graph 30. Graph 30 in FIG. 3 further illustrates the amplitude of the output voltage of the BMP harvester driven by sinusoidal accelerations of amplitudes 0.1 g, 0.25 g, 0.50 g, and 1.0 g over a 13.0 MΩ load resistance as a function of frequency for both the experimental harvester and the FEM model. It can be appreciated that the output voltage very nearly increases linearly with the acceleration, as is expected given the dependence of charge on acceleration in equation (6).

The peak voltages, in order of increasing acceleration are 6.20 V, 15.1 V, 29.2 V, and 54.3 V. There is an unexpected shift in resonant frequency from 45.0 Hz at 0.25 g to 44.0 Hz at 1.0 g. This could be due to the increase in the temperature of the beam caused by heat generated by vibration at higher accelerations causing the polyurethane to soften. As polyurethanes are highly viscoelastic materials, another possibility could be the nonlinear response of the beam due to its viscoelastic properties. It can also be seen in FIG. 4 that the simulations are in reasonable agreement with the experimental data in terms of the voltage amplitude and bandwidth. The simulations, however, do not exhibit the small shift in the resonant frequency with increasing acceleration seen in the experimental results.

Figure 4:
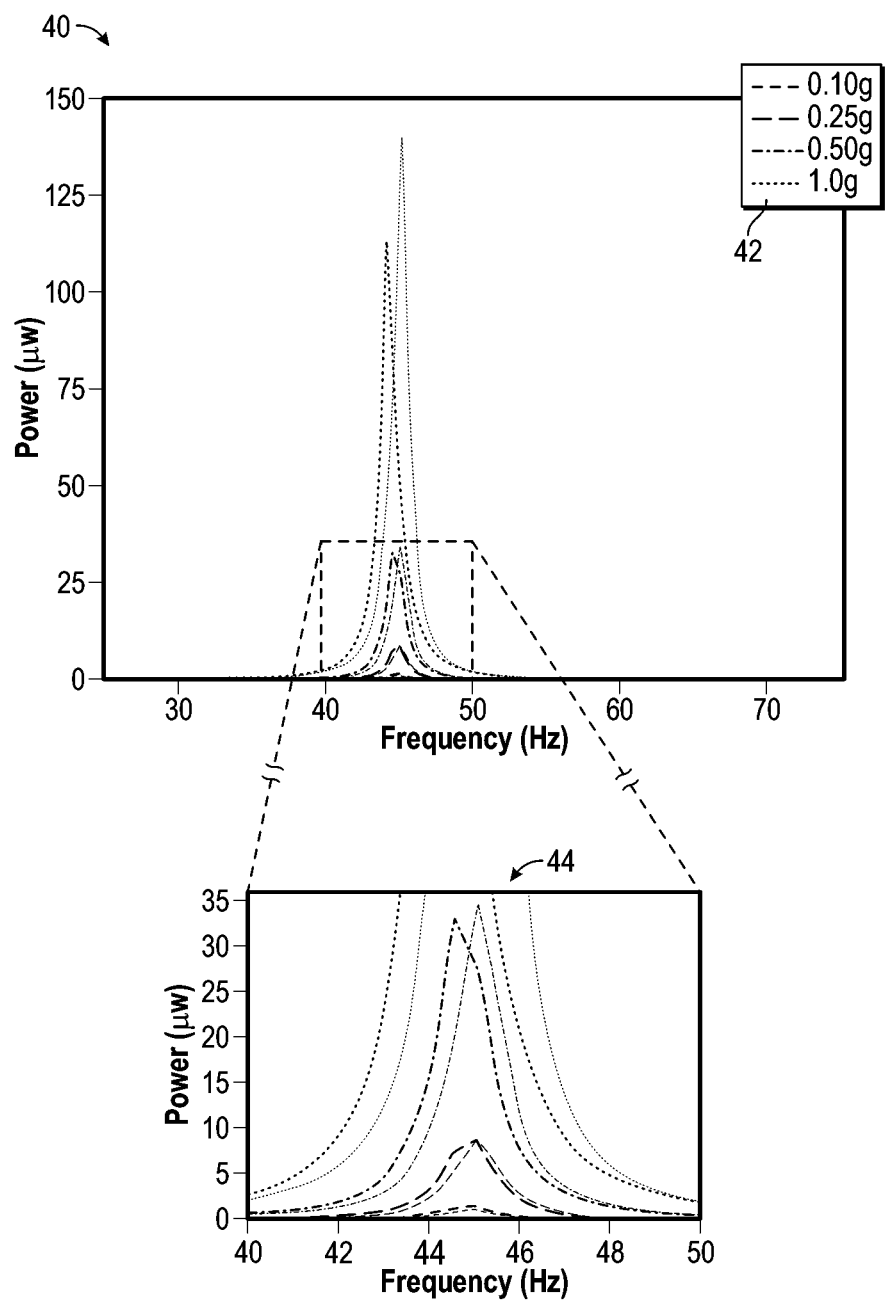
FIG. 4 illustrates a graph depicting experimental and simulated BMP harvester power output data, in accordance with another experimental embodiment.

FIG. 4 illustrates a graph 40 depicting experimental and simulated BMP harvester power output data, in accordance with another experimental embodiment. The graph 40 depicted in FIG. 4 depicts experimental (solid lines) and simulated (dashed lines) BMP harvester power output at 0.1 g, 0.25 g, 0.50 g, and 0.25 g accelerations (see legend 42 in FIG. 4). For clarity the inset plot 44 shows a magnified view of the results from lower excitation frequencies.

The graph 40 shown in FIG. 4 illustrates the amplitude of the output power of the BMP harvester driven by sinusoidal accelerations of amplitudes 0.1 g, 0.25 g, 0.50 g, and 1.0 g as a function of frequency for both the experimental harvester and the FEM model. As is expected given the nearly linear increase of voltage with respect to acceleration, the output power very nearly increases as the square of the increase in acceleration. The peak power outputs in order of increasing acceleration are, 1.47 μW, 8.75 μW, 32.7 μW, and 113 μW. The full width at half maximum (FWHM) bandwidth can be estimated from FIG. 4 to be approximately 1.5 Hz for all accelerations. Note that the agreement between experiments and the simulations for power output is similar to the voltage data as both incorporate a 13.0 MΩ load resistance.

The results of a theoretical analysis of a BMP harvester and a comparison between a BMP harvester and a PBG bimorph bear further discussion. The theoretic analysis of the electromechanical coupling of a BMP harvester shows that they are well suited to applications with space constraints. The relationship between electromechanical coupling and the ratio of beam length to piezoelectric transducer thickness indicates that shorter beams are preferable. The reduction in the moment arm due to shorter beams has to be compensated with increase in tip mass. This is a viable power enhancement route since the only restrictions placed on tip mass by a BMP harvester come from beam material and available volume. While the fracture strain of the beam could be the limiting factor, that of the piezoelectric transducer will not be. This is due to the dramatically lower strains the piezoelectric transducer experiences in a BMP harvester. However, the bonding strength between the beam and the transducer is critical due to the large stresses the bond experiences.

FIGS. 5(a), 5(b) and 5(c) illustrate a BMP harvester and PBG bimorph diagrams, in accordance with an example embodiment. FIG. 5(a) depicts a BMP harvester diagram of a BMP harvester with a beam height L, a beam width 2a, a transducer width a, and transducer thickness $t_{bmp}$ (the mechanical properties of the beam are identical to those of PZT). FIG. 5(b) depicts a PBG bimorph diagram showing a beam height L, a beam width 2a, and a transducer width $t_{bi}$. FIG. 5(c) depicts a PBG bimorph diagram showing a beam height L, a beam width 2a, a support width 2r, and a transducer thickness a–r. The mechanical properties of the beam's support layer are identical to those of PZT.

Here, a PBG bimorph can be selected as a benchmark standard against which we will compare a BMP harvester. Several simplifying assumptions can be made, as illustrated in FIGS. 5(a) to 5(c) for simplicity in comparison: 1) the elastic modulus and density of the piezoelectric transducers are the same as those of the both PBG bimorph's support beam, if any is present, and the BMP harvester's resonating beam; 2) the dimensions of the PBG bimorph are the same as the dimensions of the BMP harvester's resonating beam; 3) both devices have the same tip mass; and 4) the piezoelectric transducers of both devices are made from an identical material.

These assumptions can help to ensure that the devices will both resonate at the same frequency and experience the same input power at the same acceleration. Note that these assumptions do not consider material and manufacturing limitations.

The electrical energy stored in the piezoelectric transducers of each type of harvester will be compared when the tip of the harvester is subjected to a force F. Since the dimensions and physical parameters of the devices are the same, and the devices will exhibit the same response under dynamic loading conditions, this is a simplified method of comparing the electromechanical coupling of the devices. Additionally, since power is the time derivative of energy, this approach is also a comparison of potential power outputs.

Initially a standard BMP harvester will be compared to a PBG bimorph with no support beam (i.e. r=0), where the two piezoelectric transducers of the bimorph meet at the neutral axis. The charge Q on the plates of one of the PBG bimorph's transducers is the following:

$$Q = \frac{3d_{31}L^2F}{8a^2}. \tag{12}$$

The charge on the plates of the BMP harvester is given in equation (5). Using the formula for energy stored in a capacitor (see Appendix A, equation (10)), we can then calculate the energy stored in the transducer of the PBG bimorph as follows:

$$E_{bi} = \frac{9d_{31}^2 L^4 F^2}{128 C_{bi} a^4}, \tag{13}$$

where $C_{bi}$ is the capacitance of the PBG bimorph transducer, which is:

$$C_{bi} = \frac{Lb\varepsilon_3}{t_{bi}}. \tag{14}$$

Here, the parameter $t_{bi}$ represents the thickness of the PBG bimorph's transducer and the parameter $\varepsilon_3$ represents the dielectric constant of the piezoelectric material utilized in both devices. The energy stored in one of the BMP harvester's transducers is then calculated as follows:

$$E_{bmp} = \frac{9d_{33}^2 L^2 F^2}{32 C_{bmp} a^2}. \tag{15}$$

where $C_{bmp}$ is the capacitance of the BMP transducer, which is $$C_{bmp} = \frac{ab\varepsilon_3}{t_{bmp}}. \tag{16}$$

Here, the parameter $t_{bmp}$ represents the thickness of the BMP harvester's transducer. A comparison, incorporating Equation (14) and (16), of (13) and (15) can then be made as a ratio, resulting in $$\frac{E_{bmp}}{E_{bi}} = \frac{4at_{bmp}d_{33}^2}{Lt_{bi}d_{31}^2}. \tag{17}$$

Equation (17) indicates that the performance of a BMP harvester compared to a PBG bimorph depends on the ratio of beam half-thickness a to beam length L, the ratio of the squares of the piezoelectric stress coefficients in the 33 and 31-directions, and the ratio of the thicknesses of the piezoelectric transducers. Let us assume that the thickness of the piezoelectric transducers are the same. Considering that the ratio of d332 to d312 is approximately four ($d_{31}$=−320 pC/N, $d_{33}$=650 pC/N) for the piezoelectric material (PZT PSI-5H4E) we used for our experimental devices, a BMP harvester will have the same power output as an equivalent PBG bimorph for L/a≅16.

For a PBG bimorph with a support beam of thickness r (FIG. 5(c)), a new term (a+r) is added to $E_{bi}$ leading to $$\frac{E_{bmp}}{E_{bi}} = \frac{4a^3 t_{bmp} d_{33}^2}{L(a+r)^2 t_{bi} d_{31}^2}. \tag{18}$$

This implies that thicker support beams give the PBG bimorph a significant advantage. However, given our previous assumptions, $$t_{bi}=a-r, \tag{19}$$

so there is actually an optimum thickness for the support beam. This optimum thickness can be determined by:

$$r = \frac{a}{3}. \tag{20}$$

With the support beam at its optimum thickness, we can substitute equation (20) into (18) to find $$\frac{E_{bmp}}{E_{bi}} = \frac{9at_{bmp}d_{33}^2}{4LT_{bi}d_{31}^2}. \tag{21}$$

According to equation (21), at optimal support beam thickness, the energy ratio improves by a factor of less than two in favor of the PBG bimorph. As before, if we assume $t_{bmp}=t_{bi}$ and $d_{33}^2=4d_{31}^2$, the energy stored in the transducers of a BMP harvester and a PBG bimorph are equal when the L/a ratio of their beams are each nine, with larger values favoring the PBG harvesters.

Additionally, it is worth noting that, while the electromechanical coupling of a BMP harvester decreases as the ratio $L/t_{bmp}$ grows, the power output of a BMP harvester will increase as a result of only increasing L. This means that, even though an equivalent PBG bimorph might produce more power, it is preferable to always have the largest possible L/a for a BMP harvester. This suggests that an increase in the electromechanical coupling of a device does not necessarily correspond to an increase in output power. For example, increasing the elastic modulus of a BMP harvester's beam will increase the electromechanical coupling because it decreases the energy stored in the beam for any given applied force. However, the electrical energy stored in the transducer does not change, and therefore will not increase the power output by itself. Any apparent increase in power output will be due to increased resonant frequency if the beam length is kept the same, or increased L/a if the beam is lengthened to maintain a constant resonant frequency.

The BMP design allows for higher power output per unit transducer area compared to an equivalent PBG design as shown in the ratio of the energy per area of transducer below $$\frac{E_{bmp}/A_{bmp}}{E_{bi}/A_{bi}} = \frac{4t_{bmp}d_{33}^2}{t_{bi}d_{31}^2}. \tag{22}$$

The same comparison can be carried out with the optimum value of r, using equation (21), to show this holds true for the PBG bimorph with a support beam as well.

The advantages of a BMP harvester come from low resonant frequencies, ease of fabrication, and low cost of fabrication. While the theoretical comparison of a BMP harvester and a PBG bimorph assumed that the mechanical properties of the beams of both devices were identical, this assumption is nearly impossible to achieve in real life. In a PBG, the fact that the transducer and support beam are mechanically connected in parallel means that the stiffness of the piezoelectric transducer can place limitations on the stiffness of the cantilevered beam. This means that, to resonate at low frequencies, the beams must be either very thin (e.g., often requiring semiconductor MEMS manufacturing techniques), very long, or have very large tip masses. Within a certain size range, where it is imprudent for the harvester beam to be inches long, a BMP design allows for the harvesting of vibrational energy at useful frequencies without the need for expensive and difficult manufacturing processes. Also, the low cost of molding techniques used to fabricate BMP a polymer beam, combined with the small amount of piezoelectric material required makes them highly cost efficient.

Like PBG bimorphs, BMP harvesters are limited in bandwidth. The polymer beam of the device tested in this paper adds damping resulting in a moderate increase in bandwidth. Nevertheless, the range of frequencies over which useful energy can be harvested is small. Researchers have found many ways to harvest power over a wider range of frequencies. One way to accomplish this is to introduce nonlinearities into a PBG system. Another method that can be used to achieve broadband harvesting involves arrays of PBGs connected in series or parallel. Still another way to harvest energy from broadband vibrations, is to abandon the PBG's cantilevered beam design altogether and invent entirely new varieties of vibration energy harvesters. The principles of the electromechanical response of a BMP harvester are similar enough to those of a PBG that methods used to extend PBG bandwidth can potentially be applied to a BMP harvester with similar results. BMP harvesters should also be well suited to array applications. Creating an array of BMP harvesters with sequential resonant frequencies is a matter of mold design and careful material selection.

A vibration energy harvester with a base mounted piezoelectric transducer, referred to as a BMP harvester or BMP harvester apparatus, has been proposed and characterized in this disclosure. A theoretical comparison between a BMP harvester and a PBG bimorph has demonstrated that BMP harvesters can produce power similar to an equivalent PBG bimorph when the length to thickness ratio of the devices' beams is small. Analysis has also shown that a BMP harvester always produces more power per area of piezoelectric transducer than an equivalent PBG bimorph. Finally, experimental results have demonstrated that several microwatts of power can be generated by a BMP harvester of moderate size and with a transducer with an area of just under 10 mm$^2$. Experimental results have also shown that the FEM based numerical analysis predicts the behavior of a BMP harvester with a reasonable degree of accuracy.

The device that was fabricated and tested with respect to this disclosure demonstrates that BMP harvesters can produce microwatts of power at relatively low accelerations. In fact, more power can be coaxed out of the experimental device with just a few minor changes. The fabrication process is carried out by hand, so the electrodes on the transducer of the device are oversized to compensate for error in the placement of the beam. Perfectly sized electrodes would, based purely on reduced capacitance, increase the power output by a factor of nearly 1.5. Another complication resulting from placing the beam by hand is a misalignment between the neutral axis of the beam with the division between electrodes. With the beam off center, power will inevitably be lost. Current work geared towards improving these factors, as well as additional optimization, is showing promising results for farther increases in power output.

Based on the foregoing, it can be appreciated that preferred and alternative example embodiments are disclosed herein. For example, in one embodiment, a vibration energy harvester apparatus can be implemented, which includes a cantilevered beam resonator comprising a cantilever beam having ends, wherein the cantilevered beam resonator includes a base defined by the ends of the cantilever beam. In addition, such an apparatus can include a piezoelectric transducer having at least one piezoelectric component, wherein the piezoelectric transducer is mounted beneath the base of the cantilevered beam resonator.

In some example embodiments, a BMP (Base Mounted Piezoelectric) harvester can be provided, which includes the cantilevered beam resonator, the base, and the piezoelectric transducer. In addition, the aforementioned piezoelectric transducer can include a piezoelectric substrate. In addition, in some example embodiments, the cantilever beam can be mounted perpendicular to the piezoelectric transducer. In yet another example embodiment, the aforementioned piezoelectric transducer can include a piezoelectric substrate and the cantilever beam is mounted generally perpendicular to the piezoelectric substrate.

In still another example embodiment, the at least one piezoelectric component can include at least one (i.e., one or more) electrode. In yet another example embodiment, the at least one piezoelectric component can include a plurality of electrodes. In some example embodiments, the at least one piezoelectric component can include at least two electrodes arranged in a split configuration comprising at least one split electrode. In another example embodiment, the at least one piezoelectric component can include at least two (i.e., two or more) electrodes in a split configuration comprising at least two split electrodes. In still another example embodiment, the aforementioned piezoelectric transducer can include at least two separate transducers, wherein each transducer among the two or more transducers comprises an electrode.

In still another example embodiment, a vibration energy harvester apparatus, can be configured, which includes a cantilevered beam resonator comprising a cantilever beam having ends, wherein the cantilevered beam resonator includes a base defined by the ends of the cantilever beam; and a piezoelectric transducer having at least one piezoelectric component, wherein the piezoelectric transducer is mounted beneath the base of the cantilevered beam resonator and wherein the at least one piezoelectric component comprises at least two electrodes in a split configuration comprising at least one split or a plurality of splits.

In another example embodiment, a method of configuring a vibration energy harvester, can be implemented. Such a method can include steps or operations such as, for example, configuring a cantilevered beam resonator to comprise a cantilever beam having ends, wherein the cantilevered beam resonator includes a base defined by the ends of the cantilever beam; providing a piezoelectric transducer having at least one piezoelectric component; and mounting the piezoelectric transducer beneath the base of the cantilevered beam resonator.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

What is claimed is:

1. A vibration energy harvester apparatus, comprising:
 a cantilevered beam resonator comprising a cantilever beam having ends, wherein said cantilevered beam resonator includes a base defined by said ends of said cantilever beam; and
 a piezoelectric transducer having at least one piezoelectric component, the piezoelectric transducer comprising at least two electrodes in a split configuration wherein said piezoelectric transducer is mounted beneath said base of said cantilevered beam resonator wherein the split configuration is configured to simultaneously convert compressive forces associated with the cantilever beam to energy and tension forces associated with the cantilever beam to energy.

2. The apparatus of claim 1 further comprising a BMP (Base Mounted Piezoelectric) harvester comprising said cantilevered beam resonator, said base, and said piezoelectric transducer.

3. The apparatus of claim 1 wherein said piezoelectric transducer comprises a piezoelectric substrate.

4. The apparatus of claim 1 wherein said cantilever beam is mounted perpendicular to said piezoelectric transducer.

5. The apparatus of claim 1 wherein said piezoelectric transducer comprises a piezoelectric substrate and wherein said cantilever beam is mounted perpendicular to said piezoelectric substrate.

6. The apparatus of claim 1 wherein said at least one piezoelectric component comprises at least one bottom electrode configured on the bottom of at least one piezoelectric substrate, with the at least two electrodes in the split configuration on top of the piezoelectric substrate.

7. The apparatus of claim 1 further comprising:
 a tip mass configured on the cantilever beam, wherein a mass of the tip mass and a length of the cantilever beam are selected so that the cantilevered beam resonator has a frequency of 100 Hz or less.

8. The apparatus of claim 1 wherein said at least one piezoelectric component comprises at least one split electrode.

9. The apparatus of claim 1 wherein said at least one piezoelectric component comprises at least two electrodes in a split configuration comprising at least two split electrodes.

10. The apparatus of claim 1 wherein each of said at least two electrodes has an electrode area equal to one half of a cross-sectional area of the cantilever beam.

11. A vibration energy harvester apparatus, comprising:
 a cantilevered beam resonator comprising a cantilever beam having ends, wherein said cantilevered beam resonator includes a base defined by said ends of said cantilever beam; and
 a piezoelectric transducer having at least one piezoelectric component, wherein said piezoelectric transducer is mounted beneath said base of said cantilevered beam resonator and wherein said at least one piezoelectric component comprises at least two electrodes in a split configuration comprising at least one split or a plurality of splits.

12. The apparatus of claim 11 further comprising a BMP (Base Mounted Piezoelectric) harvester comprising said cantilevered beam resonator, said base, and said piezoelectric transducer.

13. The apparatus of claim 11 wherein said piezoelectric transducer comprises a piezoelectric substrate.

14. The apparatus of claim 11 wherein said cantilever beam is mounted perpendicular to said piezoelectric transducer.

15. The apparatus of claim 11 wherein said piezoelectric transducer comprises a piezoelectric substrate and wherein said cantilever beam is mounted perpendicular to said piezoelectric substrate.

16. A method of configuring a vibration energy harvester, said method comprising:
 configuring a cantilevered beam resonator to comprise a cantilever beam having ends, wherein said cantilevered beam resonator includes a base defined by said ends of said cantilever beam;
 providing a piezoelectric transducer having at least one piezoelectric component the piezoelectric transducer comprising at least two electrodes in a split configuration; and
 mounting said piezoelectric transducer beneath said base of said cantilevered beam resonator, wherein the split configuration is configured to simultaneously convert compressive forces associated with the cantilever beam to energy and tension forces associated with the cantilever beam to energy.

17. The method of claim 16 further comprising configuring a BMP (Base Mounted Piezoelectric) harvester comprising said cantilevered beam resonator, said base, and said piezoelectric transducer.

18. The method of claim 16 wherein said piezoelectric transducer comprises a piezoelectric substrate.

19. The method of claim 16 further comprising mounting said cantilever beam perpendicular to said piezoelectric transducer.

20. The method of claim 16 wherein said piezoelectric transducer comprises a piezoelectric substrate and wherein said cantilever beam is mounted perpendicular to said piezoelectric substrate.

* * * * *